US008319705B2

(12) United States Patent
Kumagai et al.

(10) Patent No.: US 8,319,705 B2
(45) Date of Patent: Nov. 27, 2012

(54) PLASMA DISPLAY DEVICE AND DRIVING METHOD USING ALL CELL RESET AND ON CELL RESET OPERATIONS

(75) Inventors: Junichi Kumagai, Yokohama (JP); Katsumi Ito, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 846 days.

(21) Appl. No.: 12/277,546

(22) Filed: Nov. 25, 2008

(65) Prior Publication Data

US 2009/0201227 A1 Aug. 13, 2009

(30) Foreign Application Priority Data

Feb. 7, 2008 (JP) ................................ 2008-027166

(51) Int. Cl.

| | |
|---|---|
| ***G09G 3/28*** | (2006.01) |
| ***G09G 5/00*** | (2006.01) |
| ***G09G 5/10*** | (2006.01) |
| ***G09G 5/02*** | (2006.01) |
| ***G09G 3/10*** | (2006.01) |
| ***G06F 3/038*** | (2006.01) |
| ***H01J 17/00*** | (2006.01) |
| ***H01J 17/49*** | (2012.01) |

(52) U.S. Cl. ................ 345/60; 345/61; 345/62; 345/63; 345/64; 345/65; 345/66; 345/67; 345/68; 345/69; 345/70; 345/71; 345/72; 345/204; 345/690; 345/691; 345/692; 345/693; 313/514; 313/515; 313/516; 313/517; 313/518; 313/519; 313/520; 313/521; 313/582; 313/583; 313/584; 313/585; 313/586; 313/587; 315/169.4

(58) Field of Classification Search ..................... 345/60
See application file for complete search history.

(56) References Cited

U.S. PATENT DOCUMENTS

| | | | | |
|---|---|---|---|---|
| 5,654,728 | A | 8/1997 | Kanazawa et al. | |
| 2002/0047572 | A1* | 4/2002 | Kanazawa | 315/169.3 |
| 2003/0095084 | A1 | 5/2003 | Mizobata | |
| 2003/0189534 | A1 | 10/2003 | Myoung et al. | |
| 2003/0201953 | A1 | 10/2003 | Shizaki | |
| 2004/0080280 | A1 | 4/2004 | Hibino et al. | |
| 2005/0162345 | A1 | 7/2005 | Kwon et al. | |
| 2006/0103599 | A1 | 5/2006 | Cho et al. | |
| 2006/0114186 | A1 | 6/2006 | Lee et al. | |
| 2006/0164342 | A1* | 7/2006 | Cho et al. | 345/67 |

(Continued)

FOREIGN PATENT DOCUMENTS

JP 9-97034 A 4/1997

(Continued)

*Primary Examiner* — Alexander S Beck
*Assistant Examiner* — Karin Kiyabu
(74) *Attorney, Agent, or Firm* — Miles & Stockbridge P.C.

(57) ABSTRACT

The plasma display device has a display panel having first and second display electrodes and address electrodes, an electrode drive circuit, and a drive control circuit for controlling the electrode drive circuit. The drive control circuit performs a reset drive control, address drive control and sustain drive control in each subfield. The drive control circuit performs an all cell reset drive control which resets all cells in a first subfield out of the plurality of subfields, and an ON cell reset drive control which resets ON cells in a second subfield. At a first temperature T1, an ultimate potential of an slope pulse of the first display electrode is controlled to be a first potential in the ON cell reset drive control, and at a second temperature T2>T1, the ultimate potential is controlled to be a second potential higher than the first potential.

6 Claims, 14 Drawing Sheets

U.S. PATENT DOCUMENTS

| | | | |
|---|---|---|---|
| 2008/0055288 | A1 | 3/2008 | Kawada et al. |

FOREIGN PATENT DOCUMENTS

| | | | |
|---|---|---|---|
| JP | 2000-267625 | A | 9/2000 |
| JP | 2003-15602 | A | 1/2003 |
| JP | 2003-157043 | A | 5/2003 |
| JP | 2003-302931 | A | 10/2003 |
| JP | 2004-4513 | A | 1/2004 |
| JP | 2005-196194 | A | 7/2005 |
| JP | 2006-154826 | A | 6/2006 |
| KR | 10-0570971 | B1 | 4/2006 |
| KR | 10-2006-0040448 | A | 5/2006 |
| WO | WO 2006/013658 | A1 | 2/2006 |

* cited by examiner

FIG. 10

CONTROL METHOD FOR RESET DRIVE VOLTAGE WAVEFORM

TIME →

| | SF1 | SF2 | SF3 | SF4 | SF5 | SF6 | SF7 | SF8 | SF9 | SF10 | SF11 |
|---|---|---|---|---|---|---|---|---|---|---|---|
| T1 | HVw | LVw | LVw | LVw | LVw | LVw | LVw | LVw | LVw | LVw | LVw |
| T2 | HVw | LVw | LVw | LVw | LVw | LVw | LVw | MVw | MVw | MVw | MVw |
| T3 | HVw | LVw | LVw | HVw | LVw | LVw | LVw | LVw | LVw | LVw | LVw |
| T4 | HVw | LVw | LVw | HVw | LVw | LVw | LVw | MVw | MVw | MVw | MVw |
| T5 | HVw | LVw | LVw | HVw | LVw | LVw | LVw | HVw | LVw | LVw | LVw |
| T6 | UVw | LVw | LVw | UVw | LVw | LVw | LVw | UVw | LVw | LVw | LVw |

PLASMA DISPLAY DEVICE AND DRIVING METHOD USING ALL CELL RESET AND ON CELL RESET OPERATIONS

CROSS-REFERENCE TO RELATED APPLICATIONS

This application is based upon and claims the benefit of priority from the prior Japanese Patent Application No. 2008-27166, filed on Feb. 7, 2008, the entire contents of which are incorporated herein by reference.

BACKGROUND OF THE INVENTION

The present invention relates to a plasma display device, and more particularly to a plasma display device in which the reset problem is improved.

Plasma display devices are widely used as large screen slim TVs. Recently plasma display devices are attracting particular attention as full high vision supported-slim TVs.

Driving of the panel of a plasma display device includes: a reset period when the wall charge state of the cells is reset, an address period when display electrodes are scanned and the display image is written in the cells, and a sustain period when a sustain discharge is generated for a plurality of times in the cells written in the address period, so that high brightness emission is performed. A field period for displaying one image includes a plurality of subfields, and each subfield has a reset period, address period and sustain period. In one field period, a multi-grayscale display is performed by making the sustain discharge count in the sustain period of each subfield different, and combining the subfields which turn ON.

For a plasma display device it has been proposed that the wall charge state of the cells which are turned ON is reset in the reset period, and an slope pulse (or ramp waveform pulse; the same applies hereinafter) is applied to the display electrodes to generate a micro-discharge so as to adjust the wall charge amount. Examples are disclosed in JP 2003/15602, JP 2003/157043, JP 2003/302931, JP 2004/004513, JP 2000/267625 and WO 2006/013658A1.

These patent documents disclose that a positive polarity slope pulse is applied to a Y electrode corresponding to a scan electrode, out of the display electrodes, and then a negative polarity slope pulse is applied, during the reset period.

Also WO 2006/013658A1 discloses that the drive voltage of the scan electrode or the drive voltage of the address electrode is decreased by utilizing the characteristic that the activation energy of the discharge gas increases and the drive voltage decreases as the drive load amount increases.

As mentioned above, in the reset period, a positive polarity slope pulse is applied between the Y electrode and X electrode constituting the display electrode to reset the wall charge state on the X and Y electrodes and address electrodes on the cell, and a negative polarity slope pulse is applied between the Y electrode and X electrode so as to adjust the wall charge amount to an optimum amount. By making the wall charge amount on each electrode to be an optimum amount, the address discharge can be generated between the address electrode and Y electrode only in the cells to be turned ON, and discharge can also be generated between the X and Y electrodes, in the subsequent address period. In the sustain period, a sustain pulse is applied between the X and Y electrodes for a predetermined number of times, then a sustain discharge is repeatedly generated in the ON cells written in the address period.

On the other hand, there are two types of reset discharge: an all cell reset, which resets all the cells to be scanned in the corresponding field, regardless whether the cell is ON or OFF in the previous subfield; and an ON cell reset, which resets only the cells which turned ON in the previous subfield. Performing the all cell restart in all subsubfield is ideal, but the scale of background emission becomes high, which drops contrast. Therefore the all cell reset is performed only in a part of subfield in the field period, and the ON cell reset is performed in the rest of the subfield in the field period.

However, in the plasma display device, the temperature of the panel rises if the sustain discharge count increases. And if the temperature of the panel increases, charge leaks and weak discharges in semi-selected cells in the address period become more active. The semi-selected state is a state where the scan pulse is not applied to the Y electrode, which is a scan electrode, but the address pulse is applied to the address electrode, and in particular cells on the Y electrode, which are scanned at the end of the address period, enter a semi-selected state for a long time.

In a cell in the semi-selected state, a positive voltage is applied to the address electrode, so charges on the address electrode easily leak into the discharge space, and a weak discharge tends to occur between the address electrode and Y electrode. Therefore in the cell in the semi-selected state, charges on the address electrode and charges on the Y electrode decrease, and a normal address discharge is not generated between the address electrode and Y electrode, that is, a turning OFF error occurs when the cell is selected thereafter.

In a cell where such a turning OFF error occurred, an address discharge is not generated until the wall charge state on the three electrodes is reset by the all cell reset, which causes a display failure.

SUMMARY OF THE INVENTION

With the foregoing in view, it is an object of the present invention to provide a plasma display device in which the generation of cells, where the turning OFF error occurs, is suppressed.

According to a first aspect, a plasma display device, comprises:

a display panel having a plurality of first and second display electrodes, and a plurality of address electrodes crossing the first and second display electrodes;

an electrode drive circuit which drives the first and second display electrodes and address electrodes; and a drive control circuit which controls the electrode drive circuit, wherein the drive control circuit, in subfields, performs an address drive control for selectively turning ON cells by applying an address voltage to the address electrode while scanning at least the first display electrode, and performs driving by combining an all cell reset drive control which resets cells to be scanned in a corresponding subfield regardless whether the cells are ON or OFF in the previous subfield, an ON cell reset drive control which resets ON cells in the previous subfield, and a sustain drive control which generates a sustain discharge in the ON cells, and when the display panel is at a first temperature, the drive control circuit controls an ultimate potential of an slope pulse of the first display electrode to be a first potential in the ON cell reset drive control, and when the display panel is at a second temperature, which is higher than the first temperature, the drive control circuit controls the ultimate potential of the slope pulse of the first display electrode to be a second potential, which is higher than the first potential, in the ON cell reset drive control.

According to the first aspect, the ultimate potential of the slope pulse of the first display electrode in the ON cell reset is set to a second potential, which is higher, as the temperature rises, whereby the reset discharge scale can be increased and the wall charge amount on the electrode can be increased. As a result, even if the cell enters the semi-selected state, a drop in the wall charge amount is suppressed, and the turning OFF error can be suppressed.

In the first aspect, according to a preferred embodiment, in the case of the second temperature, the drive control circuit performs the ON cell reset drive control which controls the ultimate potential to the second potential only for subfields which are arranged more distant in time from a first subfield with the all cell reset drive control, out of second subfields with the ON cell reset drive control.

In the first aspect, according to a preferred embodiment, in the case of the second temperature, the drive control circuit performs the ON cell reset drive control which controls the ultimate potential to the second potential only for a part of subfields of which sustain discharge count is high, out of second subfields with the ON cell reset drive control.

According to a second aspect of a plasma display device, the drive control circuit controls a voltage between the first and second display electrodes and a voltage between the first display electrode and address electrode in the ON cell reset drive control to be higher in a case when the display panel is at a second temperature, which is higher than a first temperature, than a case when the display panel is at the first temperature.

In the case of the second aspect as well, the reset discharge scale in the ON cell reset can be increased, and the wall charge amount on the electrode can be increased. Thereby even if the cell enters the semi-selected state, a drop in the wall charge amount is suppressed, and the turning OFF error can be suppressed.

According to a third aspect of a plasma display device, the drive control circuit controls the generation frequency of a first subfield with the all cell reset drive control to be higher in a case when the display panel is at a second temperature which is higher than a first temperature, than a case when the display panel is at the first temperature.

According to the third aspect, the frequency of the all cell reset is increased as the temperature rises, so the probability of the turning OFF due error, caused by a drop in the wall charge amount due to the semi-select state, can be decreased.

In the third aspect, according to a preferred embodiment, the drive control circuit gradually increases the generation frequency of the first subfield as the temperature of the display panel increases.

In the third aspect, according to a preferred embodiment, the drive control circuit controls the ultimate potential of the slope pulse to be higher in the all cell reset drive control for the first subfield, as the temperature of the display panel increases.

According to the above invention, the generation of the turning OFF error caused by the semi-selected state can be suppressed.

BRIEF DESCRIPTION OF THE DRAWINGS

FIG. 10 is a diagram depicting an example of a control method for reset drive voltage waveforms according to the present embodiment.

DESCRIPTION OF THE PREFERRED EMBODIMENTS

Embodiments of the present invention will now be described with reference to the drawings. The technical scope of the present invention, however, is not limited to these embodiments, but extend to matters stated in the Claims and equivalents thereof.

Figure 1:
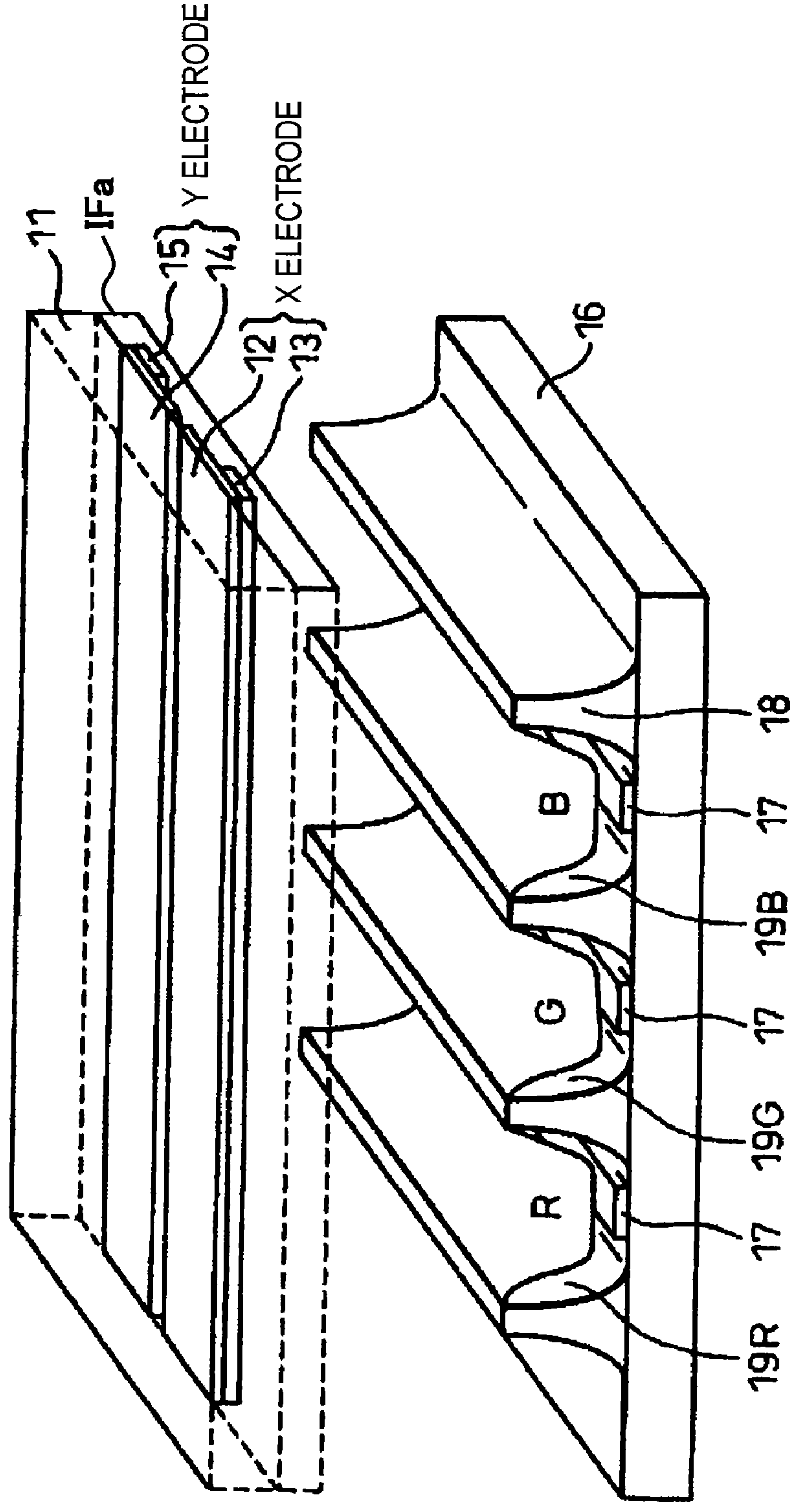
FIG. 1 is a diagram depicting a configuration of a panel of a plasma display device according to the present embodiment.

FIG. 1 is a diagram depicting a configuration of a panel of a plasma display device according to the present embodiment. The plasma display panel 10 is comprised of a front substrate 11 and a back substrate 16, which face each other with a discharge space therebetween. On the front substrate 11, a plurality of pairs of an X electrode, which is comprised of a transparent electrode 12 and a metal bus electrode 13 disposed thereon, and a Y electrode, which is comprised of a transparent electrode 14 and a metal bus electrode 15 disposed thereon, are arranged, and these X and Y electrodes are coated by a dielectric layer IFa. A pair of X and Y electrodes constitute a pair of display electrodes.

On the back substrate 16, a plurality of address electrodes 17, ribs 18 disposed between the address electrodes 17, and fluorescent layers 19R, 19G and 19B, which are formed on the address electrodes 17 and ribs 18, are disposed. The fluorescent layers 19R, 19G and 19B are excited by ultraviolet rays, which are generated when a discharge occurs in the discharge space, and emit red, green and blue lights respectively. These emission transmit through the transparent electrodes 12 and 14 of the front substrate 11, and emit to the front face side.

In FIG. 1, the ribs 18 are formed in the stripes along the address electrodes, but may be formed in a lattice shape so as to enclose each of the cell areas.

Figure 2:
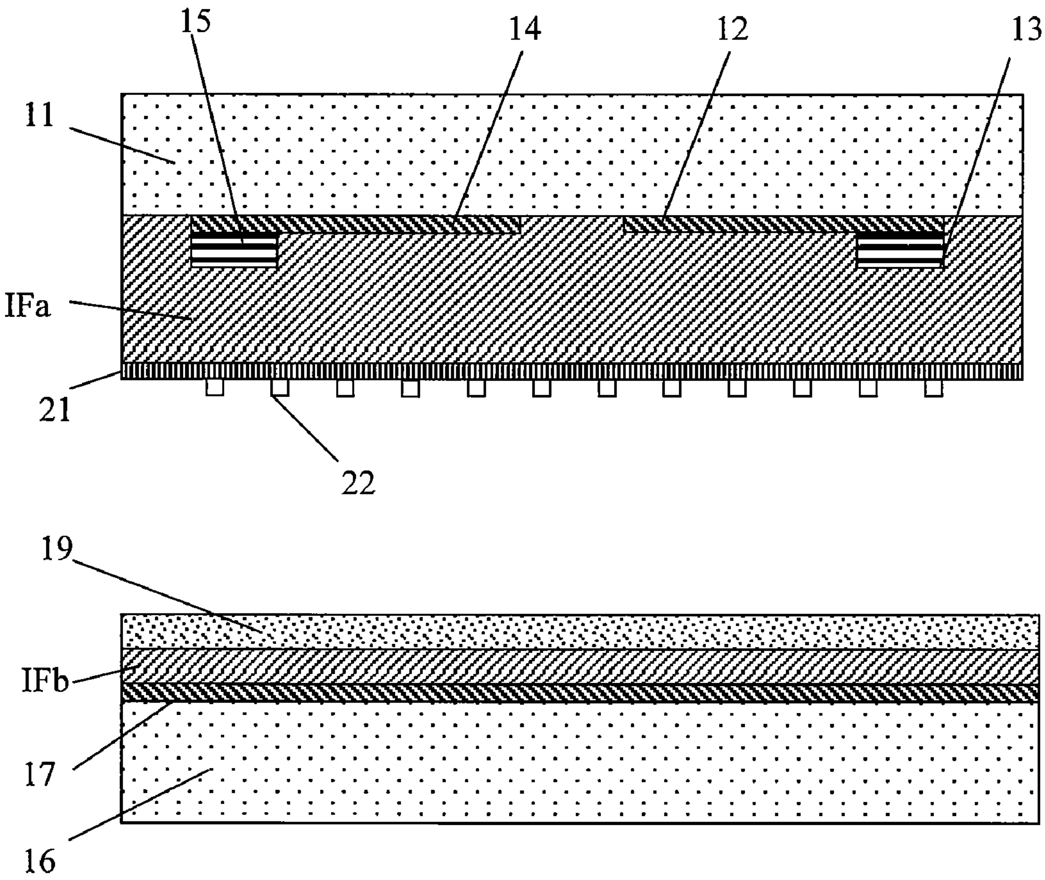
FIG. 2 shows cross-sectional views of the panel in FIG. 1.

FIG. 2 shows cross-sectional views of the panel in FIG. 1. These are cross-sections along the address electrode 17 in FIG. 1, and are denoted with the same reference numbers as FIG. 1. In other words, on the front substrate 11, an X electrode comprised of the transparent electrode 12 and metal bus electrode 13, a Y electrode comprised of the transparent electrode 14 and the metal bus electrode 15, and a dielectric layer IFa which coats thereon, are formed, and on the dielectric layer IFa, a protective film 21 made from MgO, and MgO particles 22, which are mono-crystals, are formed. MgO of the protective film 21 is a poly-crystal formed by a deposition method or sputtering method, whereas an MgO particle 22 is a mono-crystal.

On the back substrate 16, the address electrode 17, the dielectric layer IFb which coats thereon, and the fluorescent substance 19, are formed. The ribs 18 are not shown in FIG. 2.

Figure 3:
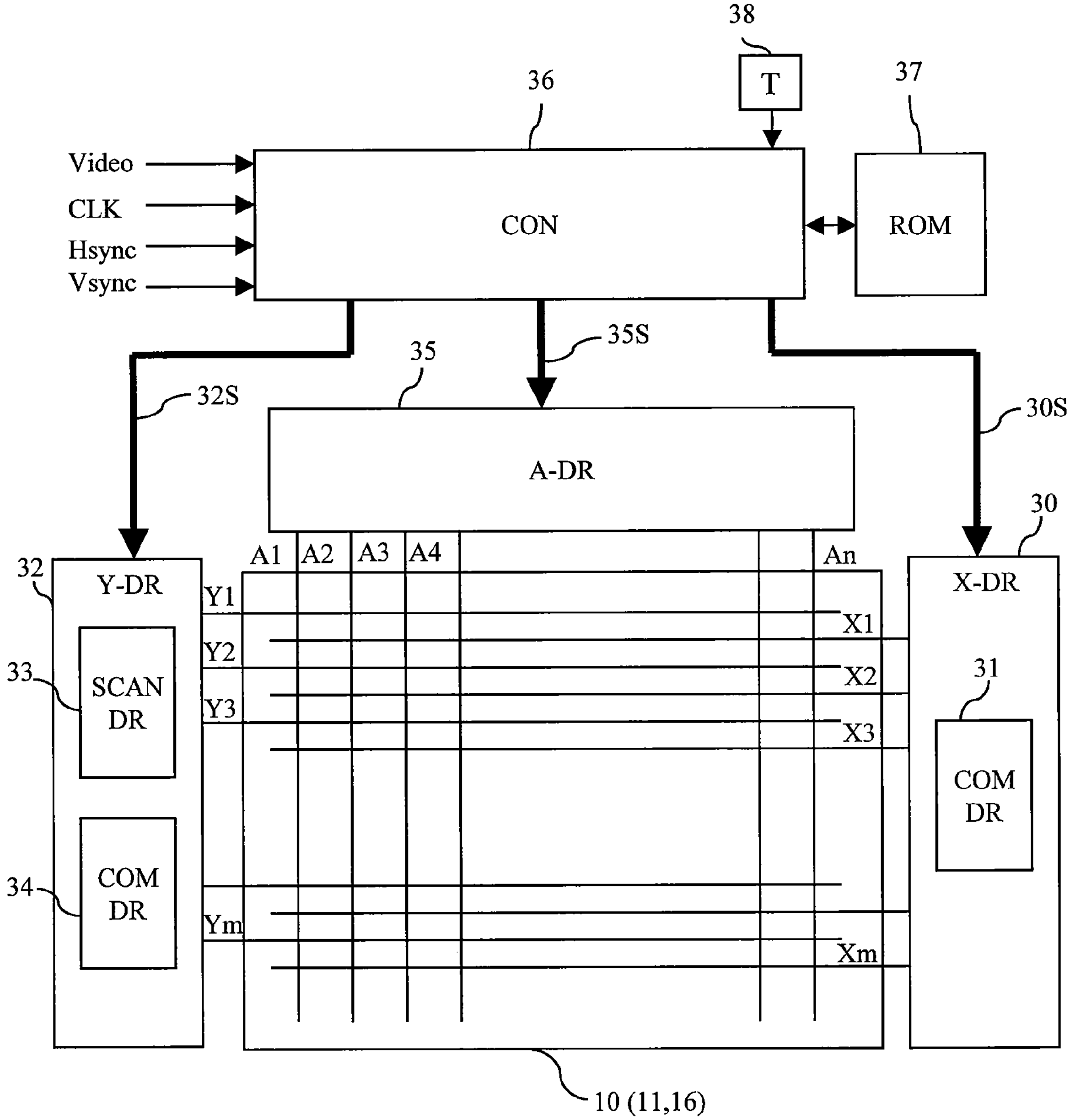
FIG. 3 is a block diagram depicting an electrode drive circuit of the plasma display device according to the present embodiment.

FIG. 3 is a block diagram depicting an electrode drive circuit of the plasma display device according to the present embodiment. In FIG. 3, the panel 10 is shown in a state where the front substrate 11 and the back substrate 16 overlap, and X electrodes X1 to Xm and Y electrodes Y1 to Ym, which extend in the horizontal direction, are alternately disposed, and the address electrodes A1 to An are disposed in the vertical direction.

The electrode drive circuit has an X electrode drive circuit 30 for driving the X electrodes, a Y electrode drive circuit 32 for driving the Y electrodes, an address electrode drive circuit 35 for driving the address electrodes, and a drive control circuit 36 for controlling the drive operation of each drive circuit by supplying control signals to these drive circuits 30, 32 and 35. The X electrode drive circuit 30 has an X side common drive circuit 31, which applies a common drive pulse to all the X electrodes, and the X side common drive circuit 31 applies a reset pulse, an address voltage and a sustain pulse to the X electrodes. The Y electrode drive circuit 32 has a scanning drive circuit 33 which applies a scan pulse to the Y electrodes Y1 to Ym, and Y side common drive circuit 34 which applies a reset pulse and a sustain pulse to all the Y electrodes.

The drive control circuit 36 inputs a horizontal synchronization signal Hsync, vertical synchronization signal Vsync, synchronization clock CLK, and analog or digital image signal Video, and reads drive control signals 30S, 32S and 35S required for driving the panel 10 from the drive signal ROM 37, and supplies them to the respective drive circuits 30, 32 and 35. The control signal 35S to the address electrode drive circuit includes the display data generated for each subfield corresponding to the image signal. The drive control circuit 36 also performs optimum drive control according to the detected temperature supplied from a temperature detection unit 38 for detecting a panel temperature.

Figure 4:
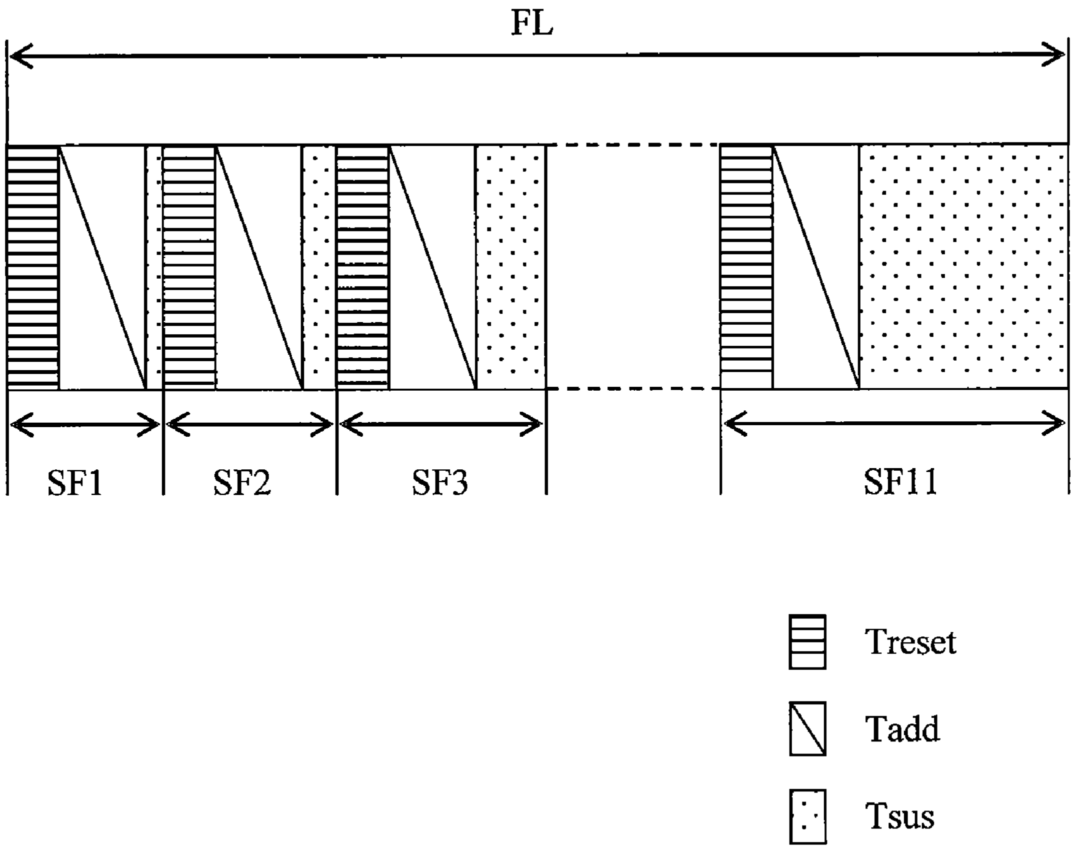
FIG. 4 is a diagram depicting the panel driving of the plasma display device according to the present embodiment.

FIG. 4 is a diagram depicting the panel driving of the plasma display device according to the present embodiment. In panel driving, one field FL has a plurality of (e.g. 11) subfields SF1 to SF11, and each subfield SF1 to SF11 has a reset period Trst, an address period Tadd and a sustain period Tsus. In the case of progressive driving, in which one frame image is displayed by one vertical scanning, the field FL and a frame are the same. Whereas in the case of interlace driving in which one frame image is displayed by double vertical scanning, two fields FL correspond to one frame. In any case, one field FL, corresponding to a vertical synchronization period, which is demarcated by the vertical synchronization signal Vsync, is a period for displaying one image of the panel.

In the present embodiment, each subfield is configured by a reset period Trst, address period Tadd and sustain period Tsus, and the reset drive voltage waveform in the reset period in each subfield is controlled to be a waveform according to the panel temperature. For the reset drive control of each subfield, the drive control circuit performs the all cell reset drive control, which generates a reset discharge in all the cells only in a part of the subfields, so as to suppress the background emission scale, and performs the ON cell reset drive control, which generates a reset discharge only in cells which turned ON in the previous subfield, for the rest of the subfields.

In the present embodiment, the drive control circuit controls the ultimate potential of the slope pulse to be applied to the Y electrodes in the ON cell reset drive control to be higher in a part of the subfields as the panel temperature increases. Also the drive control circuit controls the frequency to perform the all cell reset drive control to be higher as the panel temperature rises. And the drive control circuit controls the ultimate potential of the slope pulse to be applied to the Y electrodes in the all cell reset drive control to be higher as the panel temperature further rises.

Figure 5:
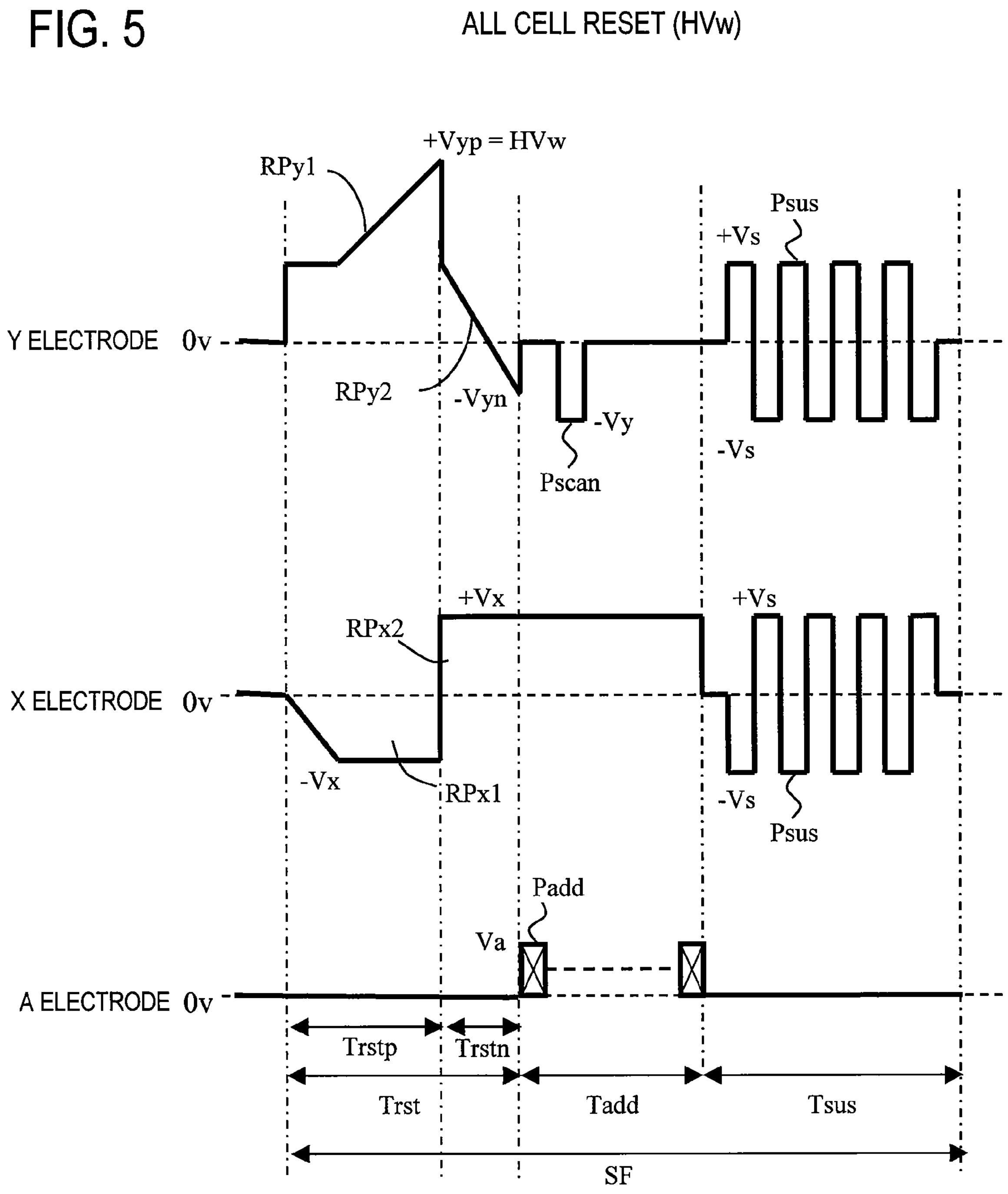
FIG. 5 is a diagram depicting a drive voltage waveform of a subfield having the all cell reset according to the present embodiment.

FIG. 5 is a diagram depicting a drive voltage waveform of a subfield having the all cell reset according to the present embodiment. The potential relationship, however, need not be exactly like FIG. 5. FIG. 5 shows the respective drive voltage waveforms of the Y electrode, X electrode and address electrode. As mentioned above, the drive control for the X and Y electrodes and address electrode of one subfield SF is a drive control for the reset period Trst first, then the address period Tadd and finally the sustain period Tsus. Therefore when the reset period Trst of the drive voltage waveform in FIG. 5 starts, each cell is in a state where the drive control for the sustain period of the previous subfield has been completed.

Figure 6:
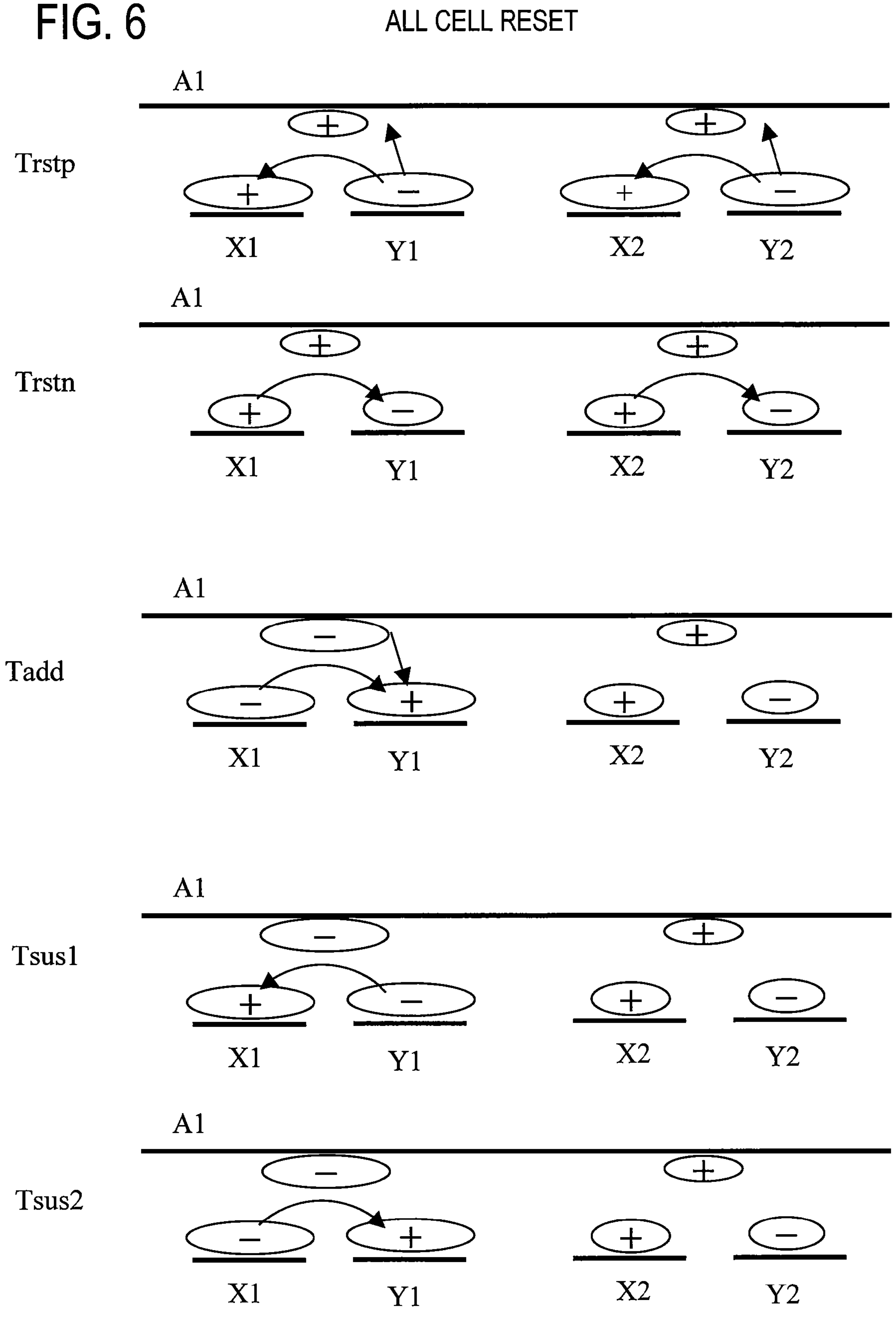
FIG. 6 are diagrams depicting the wall charge state on the three electrodes corresponding to the drive voltage waveform in FIG. 5.

FIG. 6 are diagrams depicting the wall charge state on the three electrodes corresponding to the drive voltage waveform in FIG. 5. FIG. 6 shows the respective wall charge states at the end of the two reset discharges, Trstp and Trstn, at the end of the address period Tadd, and at the end of the two sustain discharges, Tsus1 and Tsus2. Each state shows two pairs of display electrodes, X1/Y1 and X2/Y2, corresponding to the address electrode A1, and a polarity of the wall charges of these electrodes is shown by either + or −, and the charge amount thereof is indicated by a size of the ellipse respectively. In FIG. 6, the cell of the display electrodes X1 and Y1 and the address electrode A1 is turned ON, and the cell of the display electrodes X2 and Y2 and the address electrode A1 is turned OFF.

Now the drive operation in a subfield having the all cell reset will be described with reference to FIG. 5 and FIG. 6. First in the reset period Trst, a positive polarity slope pulse RPy1 is applied to the Y electrode, and a negative polarity slope pulse RPx1 is applied to the X electrode by the Y side and X side common drive circuits, and a first reset discharge Trstp (see FIG. 6) is generated. Then the negative polarity slope pulse RPy2 is applied to the Y electrode, and the positive polarity rectangular pulse RPx2 is applied to the X electrode respectively, and the second reset discharge Trstn (see FIG. 6) is generated. During the reset period, the address electrode is maintained at the ground potential or predetermined potential (not illustrated). When the all cell reset starts, the subfield is in a state where the sustain discharge Tsus2 in FIG. 6 has completed. On the other hand, when the ON cell reset starts, the subfield is in a state where the sustain discharge Tsus1 in FIG. 6 has completed, or a state where the sustain discharge Tsus2 has completed, but the amount of charges over the X, Y electrodes are smaller than that of FIG. 6.

In the first reset discharge Trstp, a positive voltage is applied to the Y electrode, and voltage which gradually decreases from ground level to voltage −Vx is applied to the X electrode, and the X electrode is maintained at a negative voltage −Vx, and a voltage which gradually increases to the ultimate voltage +Vyp (=HVw) is applied to the Y electrode. In other words, the positive slope pulse RPy1 is applied to the Y electrode, and the negative slope pulse RPx1 is applied to the X electrode respectively. Thereby the applied voltage between X and Y gradually increases from zero, and a weak discharge is repeatedly generated between the X and Y electrodes on the ON cells from the Y electrode to the X electrode direction. If the applied voltage between X and Y increases even more, a weak discharge is also repeatedly generated between X and Y of OFF cells. In the case of the all cell reset, the ultimate voltage +Vyp is set to a very high voltage HVw, so that a discharge is generated even in OFF cells.

In the first reset discharge Trstp, voltage, which gradually increases, is also applied between the Y electrode and address electrode, and a weak discharge is generated in a direction from the Y electrode to the address electrode. Sufficient amounts of negative charges and positive charges are generated on the Y electrode and X electrode by the first reset discharge Trstp, and negative charges on the address electrode are removed, and positive charges are generated.

Then in the second reset discharge Trstn, the positive polarity rectangular pulse RPx2 is applied to the X electrode, and negative polarity slope pulse RPy2 is applied to the Y electrode by the Y side and X side common drive circuits. Thereby the reverse polarity voltage, which gradually increases, is applied between the X and Y electrodes, and a weak discharge is repeatedly generated in a direction from the X electrode to the Y electrode by the above reverse polarity voltages to which positive and negative charges on the X and Y electrodes, generated by the first reset discharge, are added. As a result, the amount of positive and negative charges on the X and Y electrodes gradually decreases, and the charge amount is adjusted to be optimum for the subsequent address discharge.

Then in the address period Tadd, the X side common drive circuit drives the X electrode to the voltage +Vx, and the Y scanning drive circuit sequentially applies a negative scan pulse Pscan to the Y electrodes, and synchronizing with this, the address electrode drive circuit applies the address pulse Padd which has the address voltage Va to the address electrode of the write target cell. In the cells to be turned ON of the display electrodes X1 and Y1 in FIG. 6, voltages generated by the negative charges on the Y electrode and positive charges on the address electrode are added to the negative voltage −Vy of the Y electrode and the positive address voltage Va of the address electrode, and are applied between the address electrode and the Y electrode (between A and Y), and an address discharge is generated between A and Y. Induced by this address discharge between A and Y, a discharge is generated between the X electrode and Y electrode (between X and Y electrodes). As a result, when the address period Tadd completes, positive charges are formed on the Y electrodes, and negative charges are formed on the X electrode, and negative charges are formed on the address electrode respectively in the written cell, as shown in Tadd in FIG. 6. The charge amounts on the X and Y electrodes in particular are controlled to a level with which a discharge is generated if a sustain pulse is applied thereafter.

To the OFF cells of the display electrodes X2 and Y2 in FIG. 6, on the other hand, only the negative voltage −Vy of the Y electrode is applied, and the address voltage Va of the address electrode is not applied, and an address discharge is not generated. Therefore the wall charge state of the OFF cells is maintained in the state at the end of the reset period.

In the sustain period Tsus, the address electrode drive circuit maintains the address electrode at 0V (ground), and the Y side and X side common drive circuits apply the sustain pulse Psus, which changes between voltage +Vs and −Vs, to the Y electrode and X electrode, to be opposite polarities. As a result, 2Vs of the sustain pulse voltage is alternately applied between the X and Y electrodes. As Tsus1 in FIG. 6 shows, when an odd numbered sustain pulse is applied, a sustain discharge is generated from the Y electrode to the X electrode, as the arrow marks indicate. As a result, the polarities of the charges on the X and Y electrodes reverse. Also as Tsus2 shows, when an even numbered sustain pulse is applied, a sustain discharge is generated from the X electrode to the Y electrode, as the arrow marks indicate. As a result, the polarities of the charges on the X and Y electrodes return to the original state.

In the above sustain period, the address electrode is maintained at ground level, which is a mid-value of voltages applied to the X and Y electrodes, so even if negative charges exist on the address electrode at the end of the address period, a discharge is not generated between A and Y or A and X.

The sustain pulse Psus in FIG. 5 shows the case of performing the all cell reset in the next field. In other words, if the next field is the all cell reset, the negative polarity sustain pulse is applied to the Y electrode and the positive polarity sustain pulse is applied to the X electrode as shown in FIG. 5, and the sustain period Tsus ends. In other words, the sustain period Tsus ends with the even numbered sustain discharge Tsus2 in FIG. 6. If the next field is the ON cell reset, on the other hand, the last sustain pulse shown in FIG. 5 is not applied, but the positive polarity sustain pulse is applied to the Y electrode and the negative polarity sustain pulse is applied to the X electrode, and the sustain period Tsus ends. In other words, the sustain period Tsus ends with the odd numbered sustain discharge Tsus1 in FIG. 6. Or, if the next field is the ON cell reset, a sustain pulse with lower voltage than the normal sustain pulse voltage Vs is applied as the last even numbered sustain discharge Tsus2 in FIG. 5, and the sustain period Tsus ends. In this case, the sustain period ends in a state where the discharge polarity of charges over the X, Y electrodes is same as shown in the even numbered sustain discharge Tsus2 of FIG. 6, but the charge amount is smaller. This is the same for FIGS. 7, 11 and 13 hereinbelow.

Figure 7:
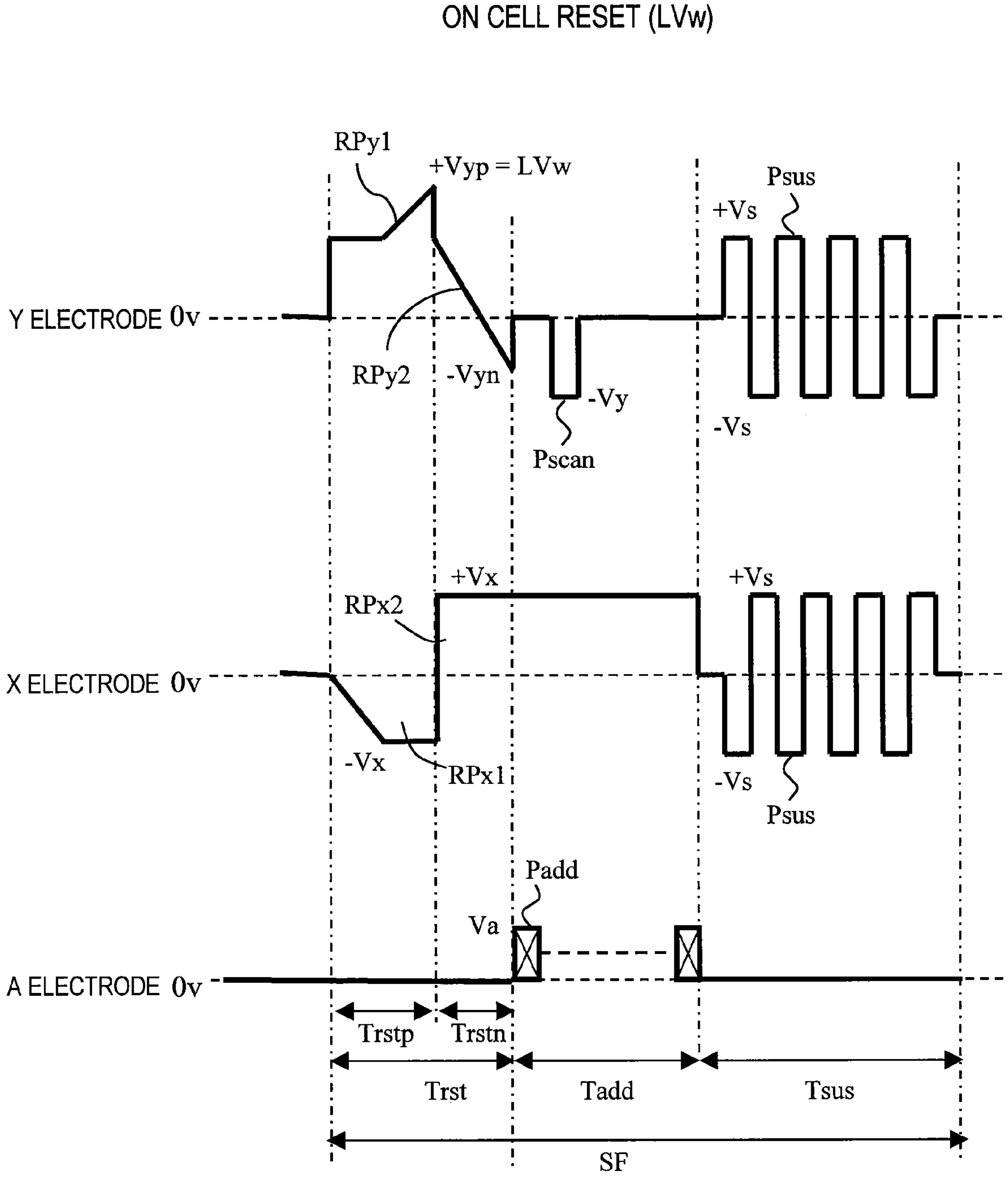
FIG. 7 is a diagram depicting a drive voltage waveform of a subfield having the ON cell reset according to the present embodiment.

FIG. 7 is a diagram depicting a drive voltage waveform of a subfield having the ON cell reset according to the present embodiment. The potential relationship, however, need not be exactly like FIG. 7. FIG. 7 shows the respective drive voltage waveforms of the Y electrode, X electrode and address electrode. The only difference of the drive voltage waveform in FIG. 7 from the drive voltage waveform of the subfield having the all cell reset in FIG. 5 is the drive voltage waveform of the reset period Trst.

In the case of the ON cell reset, the ultimate potential +Vyp of the positive reset pulse RPy1 to be applied to the Y electrode is set to be a potential LVw, which is lower than the potential HVw of the all cell reset, in the first reset discharge Trstp. Then reset pulse RPx1 to be applied to the X electrode in the first reset discharge Trstp and the reset pulses RPy2 and RPx2 to be applied to the Y electrode and X electrode in the second reset discharge Trstn are the same as the case of the all cell reset.

Figure 8:
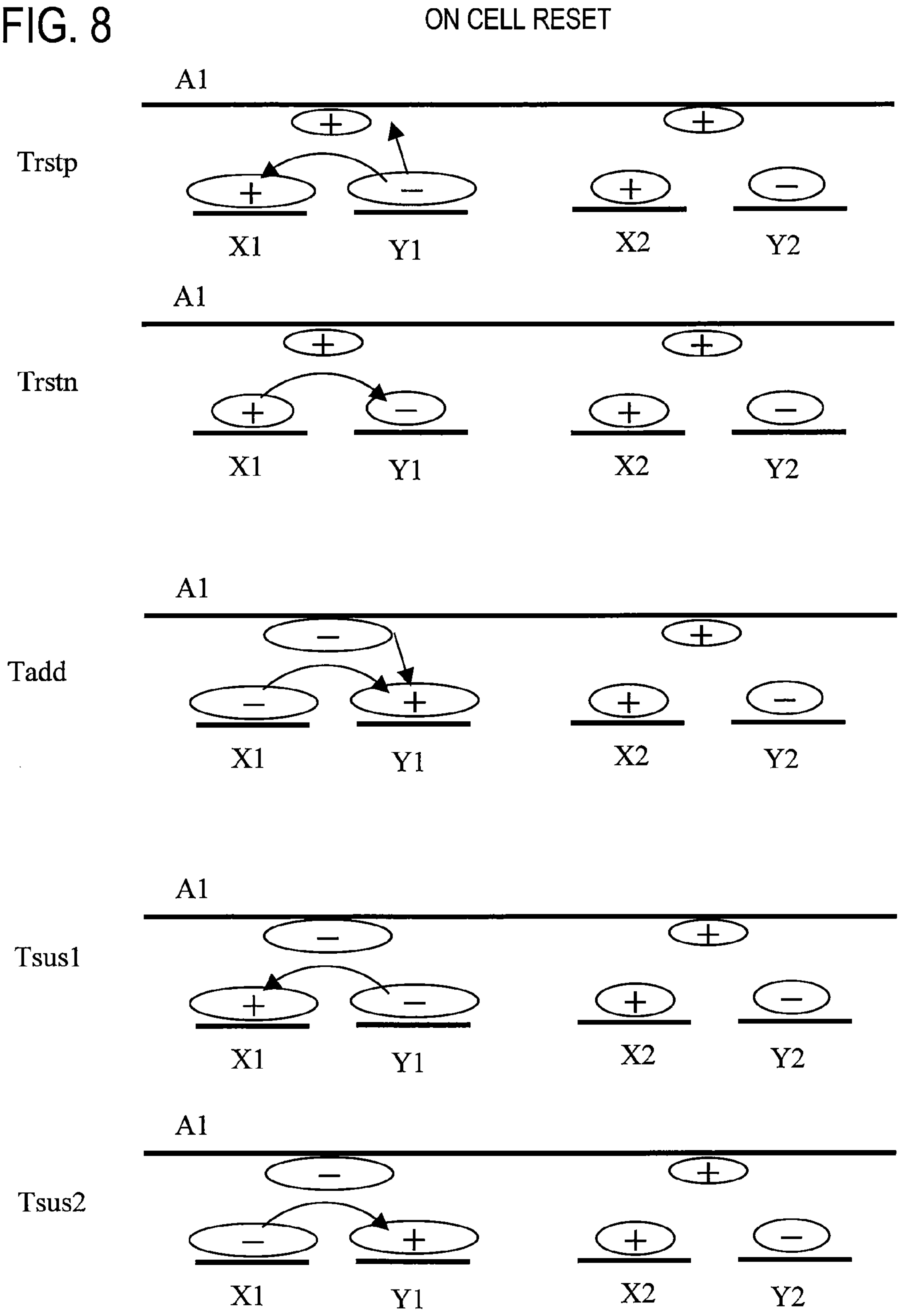
FIG. 8 is a diagram depicting the wall charge states on the three electrodes corresponding to the drive voltage waveform in FIG. 7.

FIG. 8 are diagrams depicting the wall charge states on the three electrodes corresponding to the drive voltage waveform in FIG. 7. FIG. 8 shows the wall charge states at the end of the two reset discharges, Trstp and Trstn, at the end of the address period Tadd, and at the end of the two sustain discharges, Tsus1 and Tsus2. The subfield having the ON cell reset in FIG. 8 is an example when the cell of the display electrodes X1 and Y1 and the address electrode A1 is turned ON in the previous subfield, and the cell of the display electrodes X2 and Y2 and the address electrode A1 is turned OFF.

Now the drive operation in the subfield having the ON cell reset will be described with reference to FIG. 7 to FIG. 8. The state immediately before the reset period Trst is a state where the sustain discharge Tsus2 in FIG. 6 has completed, and in the ON cell (X1, Y1), positive and negative wall charges are generated on the Y electrode and X electrode, and negative wall charges are generated on the address electrode. However, as mentioned above, the last even numbered sustain pulse voltage of the immediately before subfield is lower than the normal voltage Vs, therefore, the positive and negative charge amount over Y and X electrodes is smaller than the state before the all cell reset.

In the reset period Trst, the positive polarity slope pulse RPy1 is applied to the Y electrode, and the negative polarity slope pulse RPx1 is applied to the X electrode respectively by the Y side and X side common drive circuits, and the first reset discharge Trstp is generated. Then the negative polarity slope pulse RPy2 is applied to the Y electrode, and the positive polarity rectangular pulse RPx2 is applied to the X electrode respectively, and the second reset discharge Trstn is generated. During the reset period, the address electrode is maintained at ground potential or predetermined potential (not illustrated).

In the first reset discharge Trstp, the ultimate potential +Vyp of the positive polarity slope pulse RPy1 of the Y electrode is set to be LVw (<HVw), which is lower compared with the case of the all cell reset in FIG. 5. Therefore a weak discharge is generated in the cells which turned ON in the previous subfield from the Y electrode Y1 to the X electrode X1, and negative wall charges and positive wall charges are generated on the Y electrode Y1 and the X electrode X1 respectively. A weak discharge is also generated from the Y electrode Y1 to the address electrode A1, and positive wall charges are generated on the address electrode A1. At this time, the ultimate potential +Vyp of the positive polarity slope pulse RPy1 of the Y electrode is low, that is, LVw (<HVw), so a reset discharge is not generated in the OFF cells (X2, Y2) in the previous subfield. In other words, the ultimate potential has been set to an ultimate potential LVw, with which a weak discharge is not generated in the OFF cells.

In the second reset discharge Trstn, the negative polarity slope pulse RPy2 is applied to the Y electrode, and the positive polarity rectangular pulse RPx2 is applied to the X electrode respectively, just like the case of the all cell reset, and a weak discharge is generated from the X electrode X1 to the Y electrode Y1 of the cell which is reset, and the wall charge amounts on both electrodes X1 and Y1 decrease, whereby the charge amounts are adjusted. At this time, a weak discharge is also generated from the address electrode A1 to the Y electrode Y1, whereby the wall charge amount on the address electrode is also adjusted.

In FIG. 8, the address period Tadd and the sustain periods Tsus1 and Tsus2 are the same as the case of the all cell reset in FIG. 6, where the cells of the display electrodes X1 and Y1 are turned ON, and the cells of the display electrodes X2 and Y2 are turned OFF.

As described above, in the case of the ON cell reset, the wall charge state on the three electrodes is reset only for the cells which turned ON in the previous subfield, and a reset discharge is not generated in the OFF cells. Thereby the discharge scale at reset can be decreased, and background emission (emission which does not contribute to display) can be decreased even more than the case of the all cells reset.

The wall charge state of the cell which is reset changes if the cell is turned ON previously, but does not change if the cell is not turned ON previously, so theoretically a display drive is possible by initially performing the all cell reset, then performing only the ON cell reset. However, the wall charge state of the OFF cell gradually changes due to the influence of adjacent cells which turn ON. Therefore, the all cells reset is performed in the first subfield of one field, for example, and only the ON cell reset is performed in the other subfields, so that normal drive control can be performed while decreasing background emission.

Figure 9:
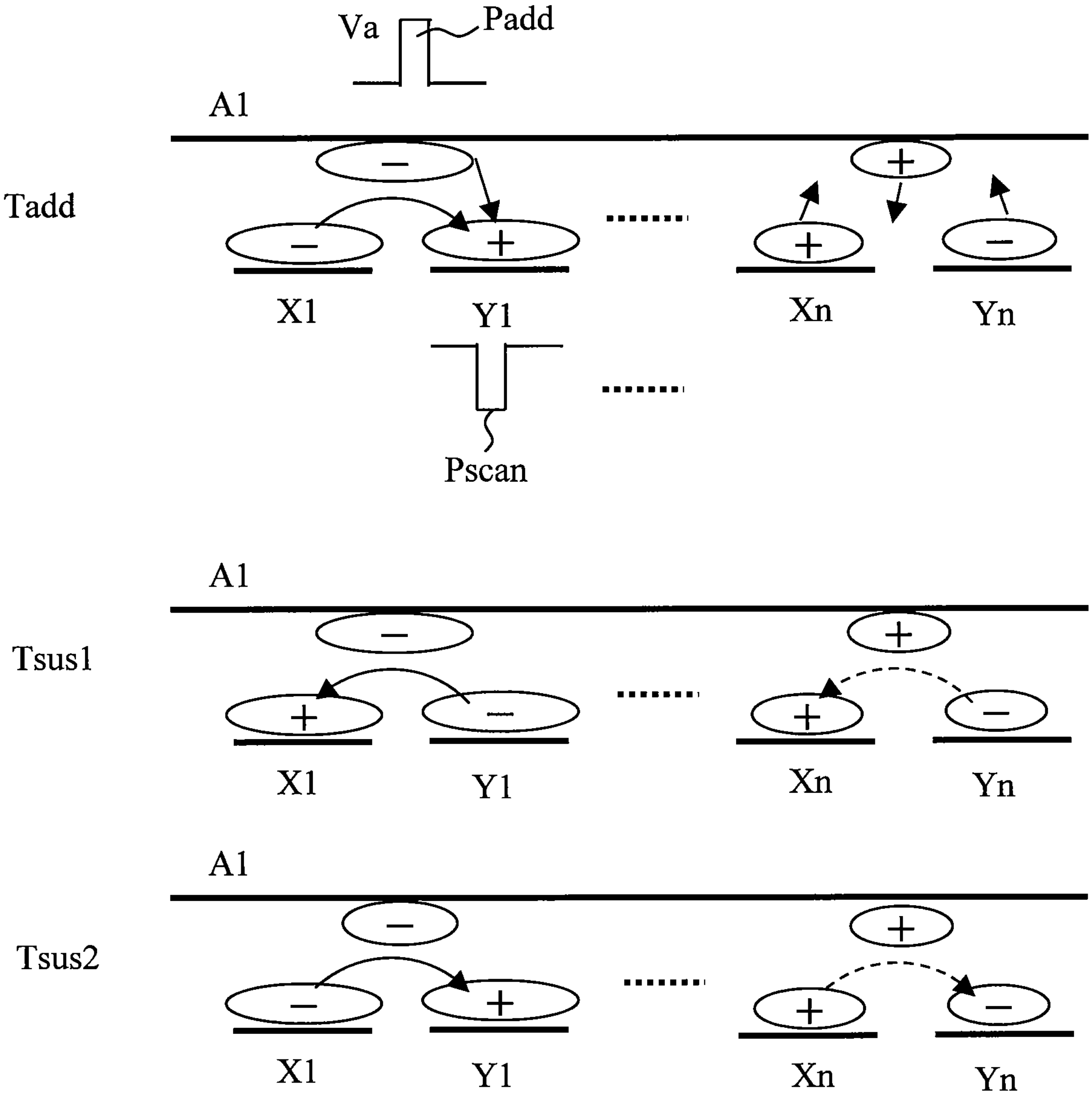
FIG. 9 is a diagram depicting the turning OFF error of a semi-selected cell.

FIG. 9 is a diagram depicting the turning OFF error of a semi-selected cell. FIG. 9 shows the wall charge states of the cells of display electrodes X1, Y1 and Xn, Yn at the end of the address period Tadd and sustain periods Tsus1 and Tsus2. In the address period Tadd, the scan pulse Pscan is applied sequentially from the Y electrode Y1, and the scan pulse is finally applied to the Y electrode Yn.

First it is assumed that negative and positive wall charges have been generated on the Y and X electrodes respectively, and positive wall charges have been generated on the address electrode at the end of the reset period. In the address period Tadd, the scan pulse Pscan is applied to the Y electrode Y1 and the address pulse Padd is applied to the address electrode A1, and an address discharge is generated from the address electrode A1 to the Y electrode Y1, and induced by this, an address discharge is generated from the X electrode X1 to the Y electrode Y1. The same address driving is also performed in adjacent display electrodes X2, Y2 (not illustrated) to Xn, Yn.

If it is assumed that lighting control is performed in all the cells along the address electrode A1, the address pulse Padd is constantly applied to the address electrode A1, and the state of the applied address voltage Va continues during the address period Tadd. As a result, the right end cell of the electrodes Xn, Yn enters a semi-selected state, that is, a state where the scan pulse Pscan is not applied to the Y electrode Yn, but address voltage Va is applied to the address electrode A1. Because of this semi-selected state, a charge leak phenomena, in which positive wall charges on the address electrode A1 or wall charges on the X and Y electrodes Xn and Yn, leak into the discharge space, occurs, or a weak discharge is generated between the address electrode A1 and Y electrode Yn. As a result, the wall charge amount in the right end cell of the electrodes Xn, Yn decreases, and in some cases, an address discharge is not normally generated when the scan pulse Pscan is applied to the Y electrode Yn. This phenomena is called the "turning OFF error".

In this way, if an address discharge is not generated in a cell which should be turned ON in the address period, such as a cell on the electrodes Xn, Yn, address writing is not executed, and a sufficient amount of wall charges is not generated on the X and Y electrodes. Therefore in the subsequent sustain period Tsus1, the polarities of the charges are reversed and a sustain discharge is not generated, and in the sustain period Tsus2, a sustain discharge is not generated since the charge amount is insufficient. Also in the cell which turned OFF in error, the wall charge amount has been decreased compared with the reset state, so an address discharge is not generated in the subsequent subfields until reaching the subfield having the all cell reset, and a display failure occurs.

The charge leak and weak discharge, due to the semi-selected state, tend to be more conspicuous as the panel temperature becomes higher. Hence a decrease in the wall charge amount, due to the semi-selected state, becomes more conspicuous in a subfield immediately after a subfield of which sustain discharge count is higher. In a subfield which is distant in time from a subfield having the all cell reset, the duration of the semi-selected state becomes lengthy, so a decrease in the wall charge amount becomes more conspicuous. And the above mentioned turning OFF error is generated in a cell where a decrease in the wall charge amount is major.

FIG. 10 is a diagram depicting an example of a control method for reset drive voltage waveforms according to the present embodiment. FIG. 10 shows the ultimate potential of the slope pulse RPy1 of the reset drive voltage waveform in each subfield SF1 to SF11 according to the panel temperatures T1 to T6. The panel temperature is lowest at T1, and highest at T6. HVw is an ultimate potential of the positive polarity slope pulse RPy1 of the Y electrode in the case of the all cell reset described in FIG. 5. LVw is an ultimate potential of the positive polarity slope pulse RPy1 of the Y electrode in the case of the ON cell reset described in FIG. 7. In other words, if the potential relationship is HVw>LVw, and the ultimate potential of the slope pulse RPy1 is HVw, which is high, then a reset is generated in all the cells, and if the ultimate potential is LVw, which is low, a reset is generated only in ON cells, and a reset is not generated in OFF cells.

MVw is a potential which is higher than LVw but lower than HVw, and the ultimate potential MVw of the slope pulse RPy1 is set to a value with which a reset discharge is generated in an ON cell but not in an OFF cell, and is set to be a value higher than LVw of the normal ON cell reset. Therefore if the ultimate potential +Vyp of the slope pulse RPy1 is MVw, the ON cell reset is performed, but ON cell reset drive at higher potential.

It is assumed that the subfields SF1 to SF11 are in a relationship in which the sustain discharge count increases in this sequence. However the control method of the present embodiment can be applied even if the subfields are not arranged in this sequence.

Figure 11:
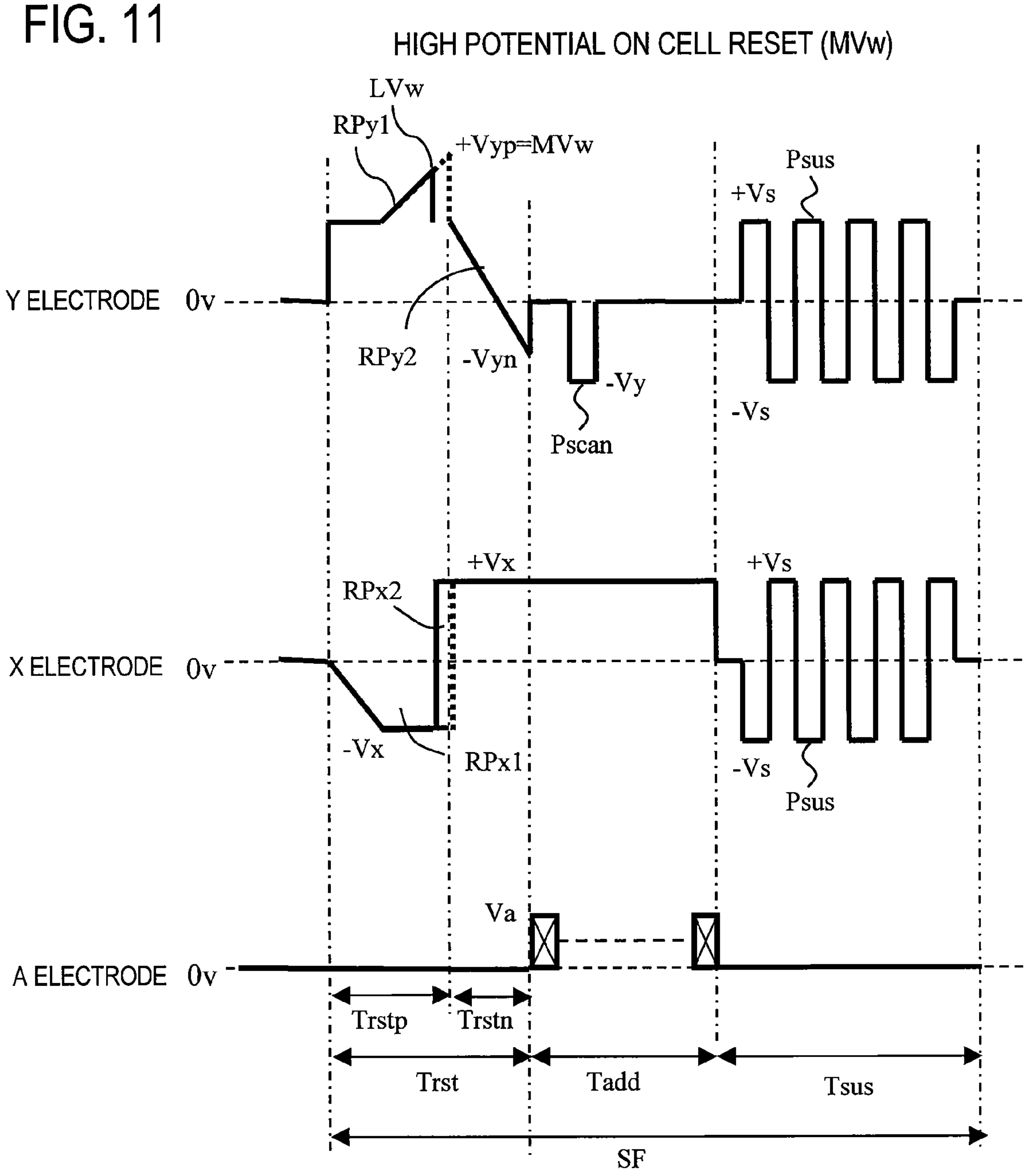
FIG. 11 is a diagram depicting a drive voltage waveform of a subfield having a high potential ON cell reset according to the present embodiment.

FIG. 11 is a diagram depicting a drive voltage waveform of a subfield having a high potential ON cell reset according to the present embodiment. The potential relationship, however, need not be exactly like FIG. 11. Compared with the drive voltage waveform in FIG. 7, the time of the first reset Trstp of the reset period Trst is lengthy, and the ultimate potential +Vyp of the positive polarity slope reset pulse RPy1, to be applied to the Y electrode, is set to be MVw higher than LVw. The rest of the drive voltage waveform is the same as FIG. 7.

As shown in FIG. 11, in the case of the high potential ON cell reset, the ultimate potential +Vyp of the positive polarity slope reset pulse RPy1, to be applied to the Y electrode, is set to be MVw, which is higher than LVw. This ultimate potential MVw, which is higher than LVw, is set to be a potential with which the first reset discharge is generated only in the ON cells, however the first reset discharge is not generated in the OFF cells.

Figure 12:
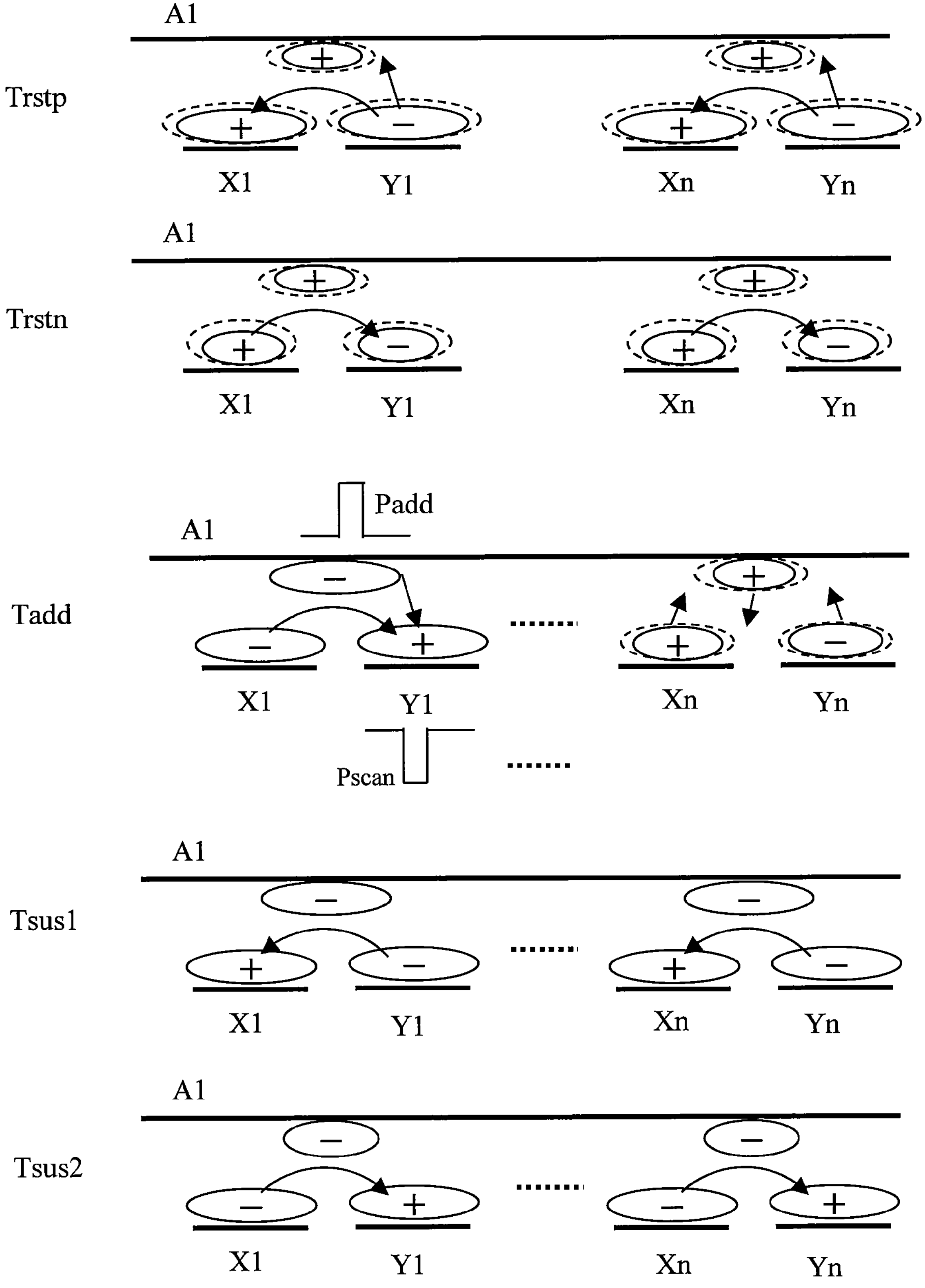
FIG. 12 is a diagram depicting the turning OFF error of the semi-selected cell after the high potential ON cell reset.

FIG. 12 is a diagram depicting the turning OFF error of the semi-selected cell after the high potential ON cell reset. FIG. 12 is an example where the cells of the display electrode pairs X1/Y1 and Xn/Yn have already been turned ON in the previous subfield, and are also turned ON in the current subfield.

In the case of the high potential ON cell reset, the ultimate potential +Vyp of the positive polarity reset pulse RPy1, to be applied to the Y electrode, is MVw, which is higher than LVw, in the first reset Trstp. Therefore in the first reset Trstp, the voltage between the Y electrode and address electrode and the voltage between the Y electrode and X electrode becomes higher, and a wall charge amount generated by the discharge in the first reset increases. In the first reset, a discharge is generated between the A and Y electrodes and between the X and Y electrodes, so the wall charge amount on the three electrodes is higher than the ON cell reset of LVw. This is shown by the broken line in FIG. 12. Hence the wall charge amount on the three electrodes after the end of the second reset Trstn is higher than the ON cell reset of LVw.

Even if the cell of the display electrode pair Xn/Yn enters the semi-selected state in the next address period Tadd, the wall charge amount at the end of reset has been increased, so a charge amount required for an address discharge is guaranteed, as indicated by the broken line, and a normal address discharge can be generated regardless whether the charge amount decreases slightly due to a charge leak and weak discharge. Since address write is normally performed, a sustain discharge is normally generated in the subsequent sustain periods Tsus1 and Tsus2.

In FIG. 11, by decreasing the voltage −Vx of the negative polarity reset pulse RPx1 of the X electrode (higher negative potential) and decreasing the potential of the address electrode (negative potential), instead of increasing the ultimate potential +Vyp of the Y electrode, both the voltage between the X and Y electrodes and voltage between the A and Y electrodes can be increased, and an effect equivalent to increasing the ultimate potential +Vyp of the Y electrode can be implemented. However the ultimate potential +Vyp of the slope pulse RPy1 of the Y electrode can be easily implemented by increasing the duration of the first reset period Trstp in the slope pulse generation circuit.

As FIG. 10 shows, according to the control method for a reset drive voltage waveform, if the panel temperature is T1, which is in the normal operation range, the all cell reset HVw is performed only in the first subfield SF1 in the subfields SF1 to SF11 in one field, and the ON cell reset LVw is performed in the rest of subfields SF2 to SF11.

If the panel temperature becomes T2, which is higher than T1, the high potential ON cell reset MVw is performed in subfields SF8 to SF11 where the sustain discharge count is high. The high potential ON cell reset MVw is also performed in the subfields SF8 to SF11, which are distant in time from the subfield SF1 having the all cell reset. Just like the case of the panel temperature T1, in the case of the panel temperature T2 as well, the all cell reset HVw is performed in the first subfield SF1 and the ON cell reset LVw is performed in the subfields SF2 to SF7.

When the panel temperature rises to T2, the charge leak and weak discharge in the above mentioned semi-selected cells are generated more actively, and a drop in the wall charge amount increases. In the subfields SF8 to SF11, where the sustain discharge count is high, the temperature rise due to a sustain discharge is also high, and time to be in the semi-selected state after the all cell reset is lengthy as well. Therefore if the reset drive voltage waveforms in these subfields SF8 to SF11 are set to be the high potential ON cell reset MVw, the wall charge amount after reset for the ON cells can be increased, and the turning OFF error in the semi-selected cell can be suppressed.

Cells which turned OFF in error cannot be turned ON unless the all cell reset is performed, as mentioned above. Hence at the panel temperature T2, it is preferable to increase the wall charge amount after the ON cell reset in the subfields SF8 to SF11, where the probability of generation of the turning OFF error is high, so as to suppress the probability of the generation of the turning OFF error. In the above example, the probability of the generation of the turning OFF error is not high in the subfields SF2 to SF7.

When the panel temperature becomes T3, which is higher than T2, the all cell reset HVw is performed not only in the first subfield SF1, but also in the subfield SF4. In the other subfields, the normal ON cell reset LVw is performed. At panel temperature T3, the count or frequency of the all cell reset HVw increases, and a number of subfields between the all cell reset is small, so the time to be in the semi-selected state is short, and the probability of the generation of the turning OFF error can be suppressed. Since the wall charge amounts of all the cells are reset to a normal amount by the all cell reset HVw in the subfield SF4, the probability of a generation of a turning OFF error in the subsequent subfield is decreased.

When the panel temperature becomes T4, which is higher than T3, the reset drive voltage waveforms in the subfields SF8 to SF11 are set to the high potential ON cell reset MVw, in addition to the all cell reset HVw in the subfields SF1 and SF4. Thereby the probability of a generation of the turning OFF error can be suppressed. Also by generating the high potential ON cell reset without increasing the number of subfields having the all cell reset, a radical increase in the background emission scale can be prevented.

When the panel temperature becomes T5, which is higher than T4, the all cell reset HVw is performed in the subfields SF1, SF4 and SF8. By increasing the count or frequency of the all cell reset as the panel temperature increases, the time to be in the semi-selected cell state can be decreased, and the turning OFF error can be suppressed.

Finally, when the panel temperature becomes T6, which is higher than T5, the high potential all cell reset UVw is performed in the subfields SF1, SF4 and SF8. In the case of the high potential all cell reset UVw, the ultimate potential +Vyp of the slope pulse RPy1 of the Y electrode in the first reset discharge is controlled to be UVw, which is higher than HVw. Thereby the wall charge amount in each all cell reset can be increased without increasing the frequency of the all cell reset, and generation of the turning OFF error due to the semi-selected cell state can be suppressed.

Figure 13:
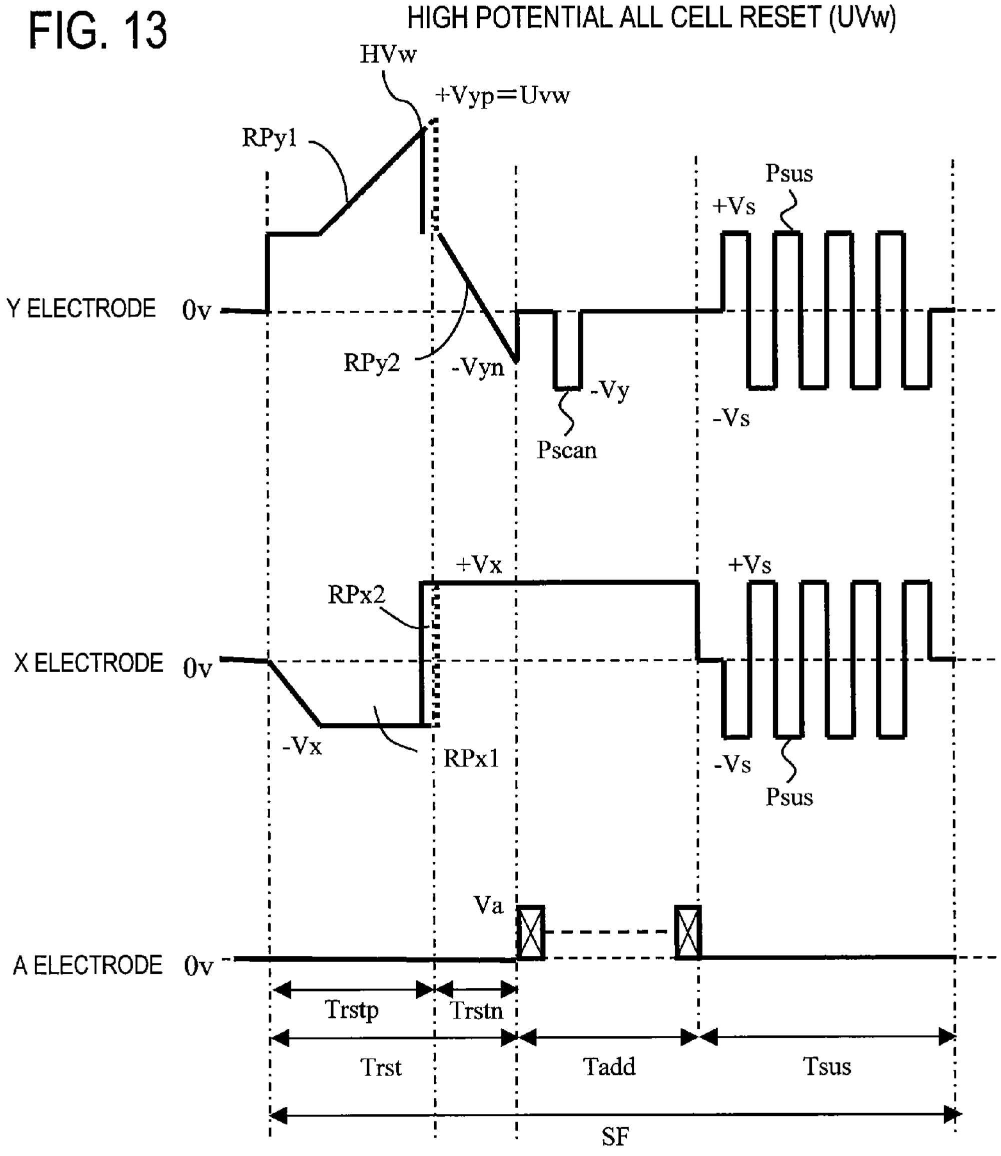
FIG. 13 is a diagram depicting a drive voltage waveform of a subfield having the high potential all cell reset according to the present embodiment.

FIG. 13 is a diagram depicting a drive voltage waveform of a subfield having the high potential all cell reset according to the present embodiment. The potential relationship, however, need not be exactly like FIG. 13. In the case of the high potential all cell reset, the ultimate potential +Vyp of the slope pulse RPy1 of the Y electrode in the first reset discharge is controlled to be UVw, which is higher than HVw of the all cell reset in FIG. 5. The rest of the waveform is the same as FIG. 5. By this waveform, the wall charge amount on the three electrodes at the end of the first reset Trstp can be increased not only in the ON cells, but also in the OFF cells. Thereby the wall charge amount at the end of the reset period Trst can be increased, and an address OFF can be prevented even if the subfield enters a semi-selected cell state in the address period, and wall charges decrease. However the scale of the reset discharge in the all cell reset increases, so the background emission scale also increases. But the high potential all cell reset at temperature T6 rarely occurs.

In the case of the high potential all cell reset, the voltage between the X and Y electrodes and voltage between the A and Y electrodes can be increased by decreasing the potential −Vx of the X electrode (higher negative potential) and decreasing the potential of the address electrode, instead of increasing the ultimate potential +Vyp of the Y electrode, and the same effect as the case of increasing the ultimate potential +Vyp of the Y electrode is implemented.

Even if the arrangement of the subfields SF1 to SF11 in one field is different from FIG. 10, it is preferable to perform the high potential ON cell reset MVw in the subfields SF8 to SF11 where the sustain pulse count is high, at the panel temperatures T2 and T4. This is because the probability of the generation of the turning OFF error, due to the rise in panel temperature, is high in these subfields. It is also preferable that the count or frequency of the all cell reset HVw at the panel temperatures T3 and T5 is increased by generating the all cell reset at a predetermined cycle.

Figure 14:
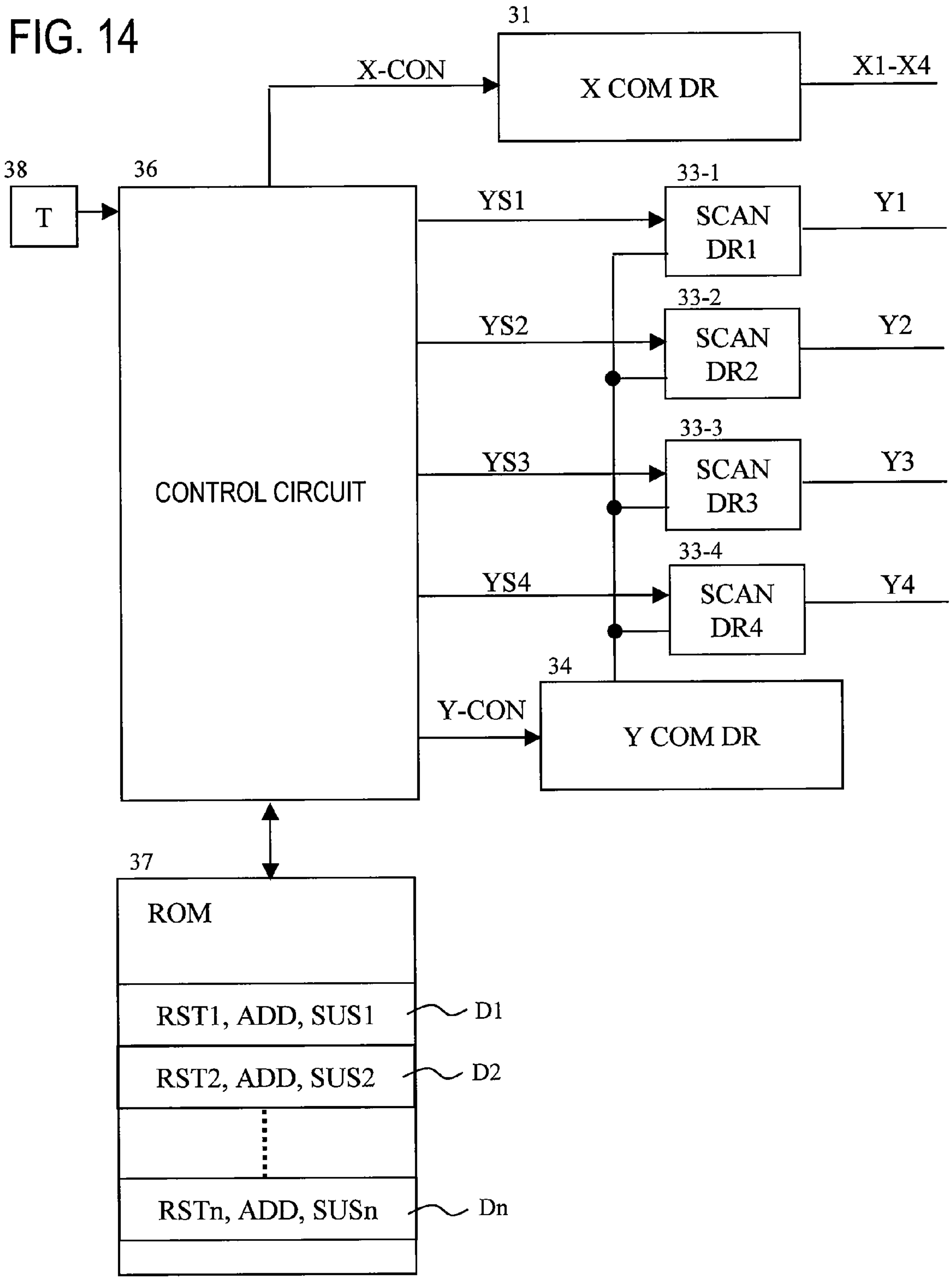
FIG. 14 is a diagram depicting the control circuit to drive the panel, the Y electrode drive circuit, and the X electrode drive circuit according to the present embodiment.

FIG. 14 is a diagram depicting the control circuit to drive the panel, the Y electrode drive circuit, and the X electrode drive circuit according to the present embodiment. The Y electrode drive circuit 32 shown in FIG. 3 has the scanning drive circuit 33 and the Y side common drive circuit 34, and the X electrode drive circuit 30 has the X side common drive circuit 31, and the control circuit 36 supplies control signals to these drive circuits.

In FIG. 14, the scanning drive circuit 33 is comprised of scanning drive circuit 33-1 to 33-4, which applies scan pulses to each Y electrode Y1 to Y4 respectively. The Y side common drive circuit 34 is commonly disposed for the plurality of Y electrodes Y1 to Y4, and a sustain drive voltage waveform and reset drive voltage waveform generated here are applied to all the Y electrodes Y1 to Y4 via each scanning drive circuit.

The control circuit 36 reads control data for performing drive control for the subfields shown in FIG. 10 from the control signal ROM 37 according to the detected temperature supplied from the temperature detection unit 38 for detecting the panel temperature. The control signal ROM 37 stores control data D1 to Dn corresponding to a plurality of types of subfields. Each control data D1 to Dn is configured by reset control data RST1 to RSTn, address control data ADD, and sustain control data SUS1 to SUSn.

The control circuit 36 performs control to read the control data D1 to Dn having a sustain control data selected according to the detected temperature of a panel, for each subfield in the panel drive control.

The specific circuit diagram of each drive circuit in FIG. 14 is disclosed in Japanese Patent Application Laid-Open No. H9-97034 (disclosed on Apr. 8, 1997), and U.S. Pat. No. 5,654,728, for example. The drive circuits disclosed in these patent publications are integrated in the present description as reference.

As described above, according to the present embodiment, when the panel temperature increases, the ultimate potential of the reset pulse of the ON cell reset is increased so that the wall charge amount generated by the reset is increased, and the generation of the turning OFF error is suppressed. Thereby display failure can be prevented while suppressing the increase in the background emission scale. If the panel temperature further increases, the count or frequency of the all cell reset is increased, so that the semi-selected cell state does not last long, thereby the generation of the turning OFF error is suppressed.

What is claimed is:

1. A plasma display device, comprising:

a display panel having a plurality of first display electrodes, a plurality of second display electrodes, and a plurality of address electrodes crossing the first and second display electrodes;

electrode drive circuitry which drives the first and second display electrodes and the address electrodes; and a drive control circuit which controls the electrode drive circuitry, wherein the drive control circuit, in subfields, performs driving by combining (i) an address drive control for selectively turning ON cells by applying an address voltage to one address electrode of the plurality while scanning at least the first display electrodes, (ii) a reset drive control having either an all cell reset drive control which performs a reset discharge of all cells to be scanned in a given subfield regardless of whether the cells are ON or OFF at a start of the reset drive control or an ON cell reset drive control which performs a reset discharge only of cells of the subfield that are ON at the start of the reset drive control, and (iii) a sustain drive control which generates a sustain discharge in cells to be turned ON, both the all cell reset drive control and the ON cell reset drive control include a first driving for applying voltages so that a potential difference between corresponding first and second display electrodes increases with time in a first polarity mode, and then a second driving for applying voltages so that the potential difference between the corresponding first and second display electrodes increases with time in a second polarity mode opposite to the first polarity mode, a beginning potential difference between the corresponding first and second display electrodes at the beginning of applying the voltages in the first driving is smaller than a potential difference between the corresponding first and second display electrodes according to sustain pulses applied in the sustain drive control, a reaching potential difference between the corresponding first and second display electrodes according to the applied voltages in the first driving is larger than the potential difference between the corresponding first and second display electrodes according to the sustain pulses, the reaching potential difference between the corresponding first and second display electrodes in the first driving of the all cell reset drive control is larger than the reaching potential difference between the corresponding first and second display electrodes in the first driving of the ON cell reset drive control, the reaching potential difference between the corresponding first and second display electrodes in the first driving of the all cell reset drive control is substantially the same in cases of the display panel being at a first temperature and at a second temperature higher than the first temperature, and the drive control circuit controls so that the reaching potential difference between the corresponding first and second display electrodes in the first driving of the ON cell reset drive control, when the display panel is at the second temperature, is larger than the reaching potential difference between the corresponding first and second display electrodes in the first driving of the ON cell reset drive control when the display panel is at the first temperature.

2. The plasma display device according to claim 1, wherein the drive control circuit performs the all cell reset drive control in a reset period in a first subfield within a single display field, and in the case of the second temperature, the drive control circuit performs the ON cell reset drive control in which the reaching potential difference between the corresponding first and second display electrodes in the first driving at the second temperature is larger than at the first temperature only for subfields which are arranged distant in time from the first subfield.

3. The plasma display device according to claim 2, wherein an ultimate potential of a slope pulse of the first display electrode in the all cell reset drive control is an all cell reset potential with which a discharge is generated in both ON cells and OFF cells, and an ultimate potential of a slope pulse of the first display electrode in the ON cell reset drive control is an ON cell reset potential with which a discharge is generated in the ON cells, and a discharge is not generated in the OFF cells.

4. The plasma display device according to claim 1, wherein in the case of the second temperature, the drive control circuit performs the ON cell reset drive control in which the reaching potential difference between the corresponding first and second display electrodes in the first driving at the second temperature is larger than at the first temperature only for subfields including a subfield of which a sustain discharge count is the highest in a single display field.

5. The plasma display device according to claim 1, wherein an ultimate potential of a slope pulse of the first display electrode in the all cell reset drive control is an all cell reset potential with which a discharge is generated in both ON cells and OFF cells, and an ultimate potential of a slope pulse of the first display electrode in the ON cell reset drive control is an ON cell reset potential with which a discharge is generated in the ON cells, and a discharge is not generated in the OFF cells.

6. A method for driving a plasma display panel, in which a plurality of first display electrodes, a plurality of second display electrodes, and a plurality of address electrodes crossing the first and second display electrodes are provided, for displaying an image of one field by a plurality of subfields each having a reset period, an address period, and a sustain discharge period, the method comprising:

performing a reset driving control, in the reset period, which is either an all cell reset drive control which performs a reset discharge of all cells to be scanned in a given subfield regardless of whether the cells are ON or OFF at a start of the reset drive control or an ON cell reset drive control which performs a reset discharge only of cells of the subfield that are ON at the start of the reset drive control, wherein both the all cell reset drive control and the ON cell reset drive control include a first driving for applying voltages so that a potential difference between corresponding first and second display electrodes increases with time in a first polarity mode, and then a second driving for applying voltages so that the potential difference between the corresponding first and second display electrodes increases with time in a second polarity mode opposite to the first polarity mode, a beginning potential difference between the corresponding first and second display electrodes at the beginning of applying the voltages in the first driving is smaller than a potential difference between the corresponding first and second display electrodes according to sustain pulses applied in a sustain drive control, a reaching potential difference between the corresponding first and second display electrodes according to the applied voltages in the first driving is larger than the potential difference between the corresponding first and second display electrodes according to the sustain pulses, the reaching potential difference between the corresponding first and second display electrodes in the first driving of the all cell reset drive control is larger than the reaching potential difference between the corresponding first and second display electrodes in the first driving of the ON cell reset drive control, the reaching potential difference between the corresponding first and second display electrodes in the first driving of the all cell reset drive control is substantially the same in cases of the plasma display panel being at a first temperature and at a second temperature higher than the first temperature, and the reaching potential difference between the corresponding first and second display electrodes in the first driving of the ON cell reset drive control, when the plasma display panel is at the second temperature, is larger than the reaching potential difference between the corresponding first and second display electrodes in the first driving of the ON cell reset drive control when the plasma display panel is at the first temperature.

* * * * *